United States Patent
Feyereisen et al.

(10) Patent No.: US 7,719,483 B2
(45) Date of Patent: May 18, 2010

(54) SYNTHETIC VISION FINAL APPROACH TERRAIN FADING

(75) Inventors: Thea L. Feyereisen, Hudson, WI (US); Jeffrey M. Rye, Minneapolis, MN (US); Trent C Reusser, New Brighton, MN (US)

(73) Assignee: Honeywell International Inc., Morristown, NJ (US)

( * ) Notice: Subject to any disclaimer, the term of this patent is extended or adjusted under 35 U.S.C. 154(b) by 799 days.

(21) Appl. No.: 11/537,898

(22) Filed: Oct. 2, 2006

(65) Prior Publication Data

US 2007/0176794 A1    Aug. 2, 2007

Related U.S. Application Data

(60) Provisional application No. 60/726,314, filed on Oct. 13, 2005.

(51) Int. Cl.
G01C 23/00    (2006.01)
G09G 5/00    (2006.01)

(52) U.S. Cl. .............. 345/7; 340/945; 701/3; 701/14; 345/428; 345/9

(58) Field of Classification Search .......... 345/428, 345/7–9; 701/3, 14, 11; 340/945, 947, 948
See application file for complete search history.

(56) References Cited

U.S. PATENT DOCUMENTS

| 5,838,262 | A | 11/1998 | Kershner et al. |
| 6,757,085 | B1 | 6/2004 | Halldorsson |
| 7,010,398 | B2 * | 3/2006 | Wilkins et al. ............... 701/3 |
| 2004/0263512 | A1 * | 12/2004 | Santodomingo et al. .... 345/428 |

FOREIGN PATENT DOCUMENTS

| EP | 1465115 | 10/2004 |
| EP | 1533753 | 5/2005 |
| FR | 2610752 | 8/1988 |
| WO | 03005305 | 1/2003 |
| WO | 03015057 | 2/2003 |

* cited by examiner

*Primary Examiner*—Amare Mengistu
*Assistant Examiner*—Joseph G Rodriguez
(74) *Attorney, Agent, or Firm*—Ingrassia Fisher & Lorenz, P.C.

(57) ABSTRACT

A method of removing synthetic vision terrain and objects from a graphical display when unsafe to rely on the synthetic vision terrain and objects is provided. The method comprises receiving current position data from at least one sensor, determining when to fade out synthetic vision terrain and objects based on the position data received, and fading out synthetic vision terrain and objects gradually when determined.

20 Claims, 9 Drawing Sheets

SYNTHETIC VISION FINAL APPROACH TERRAIN FADING

CROSS-REFERENCE TO RELATED APPLICATIONS AND CLAIM FOR PRIORITY

This application claims the priority of U.S. Provisional Application No. 60/726,314, entitled "Synthetic Vision Final Approach Terrain Fading," filed on Oct. 13, 2005, which is incorporated by reference into the present application. The present application hereby claims priority, under 35 U.S.C. §119(e), to U.S. Provisional Patent Application No. 60/726,314.

BACKGROUND

Synthetic vision displays provide a 3-dimensional perspective conformal display of terrain and objects to pilots and operators of various crafts and vehicles. These displays benefit pilots and operators by presenting pertinent information in an intuitive way. More and more new vehicles and aircraft are implementing the latest technology in synthetic vision displays. Consequently, operators are using these displays more and relying on the benefits these displays offer.

However, there are certain circumstances in which it is unsafe for pilots or operators to rely solely or too heavily on synthetic vision displays. One such circumstance is during final approach prior to landing an aircraft. Terrain and object databases used to provide the necessary data to generate a synthetic vision display are subject to resolution, integrity, validity, and position errors. For example, in some circumstance, for safety purposes, the highest point of a given terrain is used in displaying the height of the terrain even if the highest point is not the closest point to the aircraft. This can result in obscuring other objects or at least may mislead the pilot. It is, therefore, desirable that the pilot ceases relying on the synthetic vision display of terrain and objects in such circumstances and relies instead on a view of the actual terrain out the window or real-time sensor data such as infra-red or millimeter wave system data.

SUMMARY

The above-mentioned problems and other problems are resolved by the present invention and will be understood by reading and studying the following specification.

In one embodiment, a method of removing synthetic vision terrain and objects from a graphical display when unsafe to rely on the synthetic vision terrain and objects is provided. The method comprises receiving current position data from at least one sensor, determining when to fade out synthetic vision terrain and objects based on the position data received, and fading out synthetic vision terrain and objects gradually when determined.

DRAWINGS

DETAILED DESCRIPTION

Figure 1:
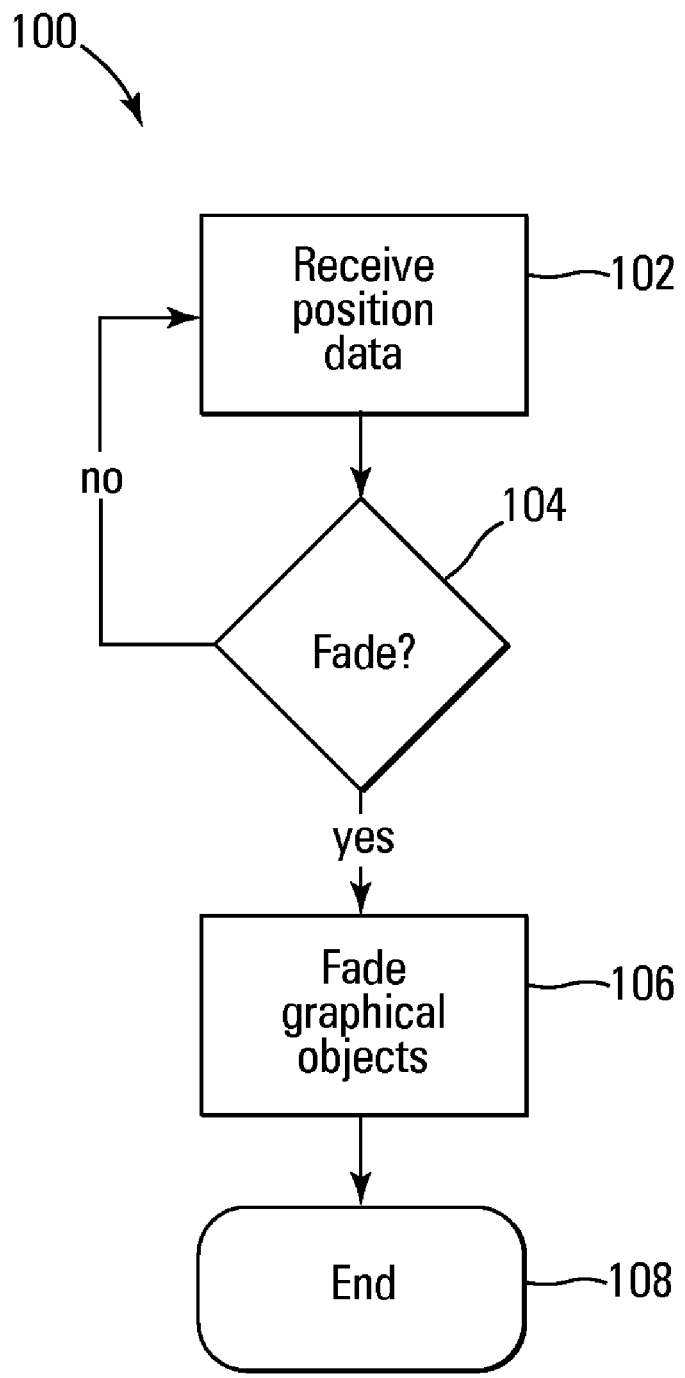
FIG. 1 is a flow chart showing a method of removing synthetic vision terrain and objects from a display when unsafe to rely on the synthetic vision terrain and objects according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of displays, such as displays in space craft and automobiles. Moreover, embodiments of the present invention are suitable for use on CRT displays, LCD displays, organic LED, plasma displays or any other existing or later developed display technology.

It should also be understood that the exemplary methods illustrated may include additional or fewer steps or may be performed in the context of a larger processing scheme. Furthermore, the methods presented in the drawing figures or the specification are not to be construed as limiting the order in which the individual steps may be performed. Instructions for carrying out the various methods, process tasks, calculations, control functions, and the generation of display signals and other data used in the operation of the display system are implemented in software programs, firmware or computer readable instructions. These instructions are typically stored on any appropriate medium used for storage of computer readable instructions such as floppy disks, conventional hard disks, CD-ROM, flash memory ROM, nonvolatile ROM, RAM, and other like medium. The following detailed description is, therefore, not to be taken in a limiting sense.

Synthetic vision 3-dimensional and sensor enhanced displays enable an operator to gain awareness of the surroundings quickly and efficiently through an intuitive interface. In particular, these displays enable an operator to gain greater awareness of the surroundings around the craft. In most circumstances, an operator's use of and reliance on these displays enables the operator to operate more safely and accurately. However, in certain circumstances, an operator's use of and reliance on these displays actually makes it more dangerous for the operator and the craft. One such circumstance is during the final approach when landing an aircraft. Due to limitations in the displays and due to certain safety precautions, the height and existence of some terrain and objects may be misleading on the displays. The displays can be misleading because potentially hazardous objects on the display may be obscured, the height and location of objects may not be completely accurate or objects may not be displayed at all. Therefore, in this exemplary situation, it is desirable for pilots to look directly out the window rather than relying solely on the displays when landing.

Embodiments of the present invention facilitate the desired pilot response during final approach. Embodiments of the present invention facilitate this response by determining when it is desirable for a pilot to switch views and by providing smooth visual cues which indicate that the pilot should focus out the window without unnecessarily startling the pilot or causing undue stress. Therefore, embodiments of the present invention help ameliorate dangerous conditions caused by reliance on synthetic vision displays during landing while allowing the positive benefits of such displays during flight. Additionally, embodiments of the present invention help a pilot during final approach without adding stress to the pilot.

FIG. 1 is a flow chart showing a method 100 of removing synthetic vision terrain and objects from a display according to one embodiment of the present invention. Method 100 is used, therefore, to help operators transition from stored synthetic data to real-time data. Real-time data can include data provided from real-time sensors or data from an operator's visual/auditory perceptions such as by looking out a window of an aircraft.

Method 100 begins at 102 where current position data is received. In some embodiments, the position data is data regarding position with respect to a final destination. For example, in some embodiments, the position data is a distance of a lunar lander from the moon. In other embodiments, the position data is a longitudinal/latitudinal distance from a final destination. In other embodiments, the position data is altitude data, such as for an aircraft. In some such embodiments, the altitude data is obtained with respect to a final destination such as an airport. In some embodiments, the altitude upon which the determination is made to fade out display terrain is set prior to flight and remains the same regardless of destination. In other embodiments, the altitude changes based on the final approach destination.

At 104, a determination is made, based on the position data received at 102, if synthetic vision terrain and objects on the graphical display should be faded out or not. For example, as an aircraft comes into relatively close proximity to the ground as it is landing, it becomes dangerous for a flight crew to continue relying on the synthetic terrain and objects. Hence, the determination is made to fade out the synthetic vision terrain and objects in that example based on the position of the aircraft. FIGS. 2-5 provide exemplary embodiments of how this determination is made. In FIGS. 2-5, altitude data is used. However, it will be understood by one of skill in the art that other position data can be used in other embodiments. For example, in some embodiments, latitudinal/longitudinal data is used.

If the synthetic vision terrain and objects are not faded out, the process continues at 102, where updated current position data is received. At 104, a determination is made again, based on the updated data, if the synthetic vision terrain and objects should be faded. This loop continues until it is determined that the synthetic vision terrain and objects should be faded out. Once that determination is made, the process continues at 106 where the synthetic vision terrain and objects are faded out. Once the synthetic vision terrain and objects have been faded out, the process ends at 108. The synthetic vision terrain and objects represent real-world objects. Synthetic vision terrain and objects include, but are not limited to, synthetic vision representations of terrain, buildings, roads, etc. The graphical objects are implemented as synthetic 3-dimensional graphics, in some embodiments. In other embodiments, the graphical objects are implemented as enhanced photographic images.

Figure 7:
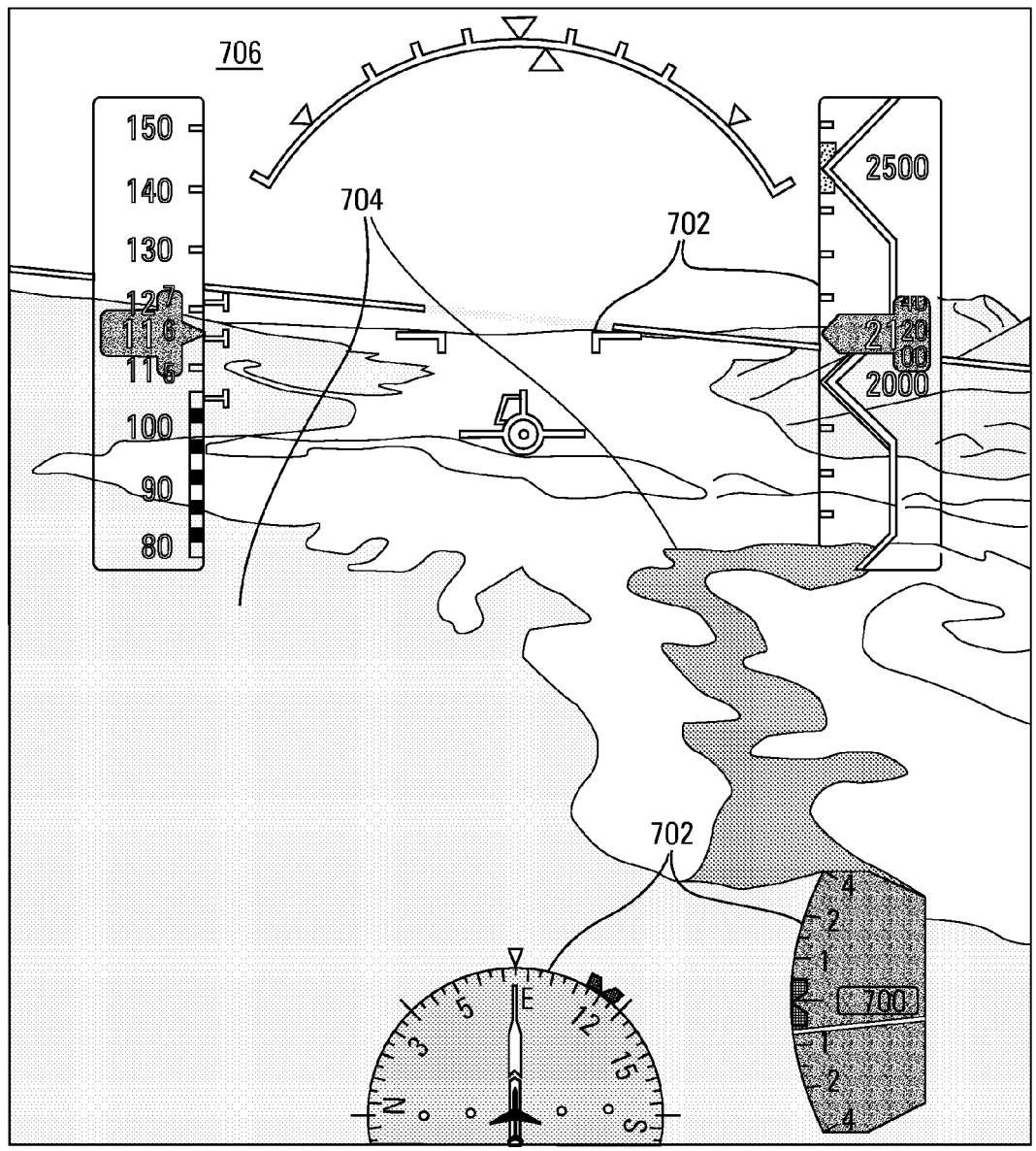
FIG. 7 is an image of a graphical display during flight according to one embodiment of the present invention.
Figure 8:
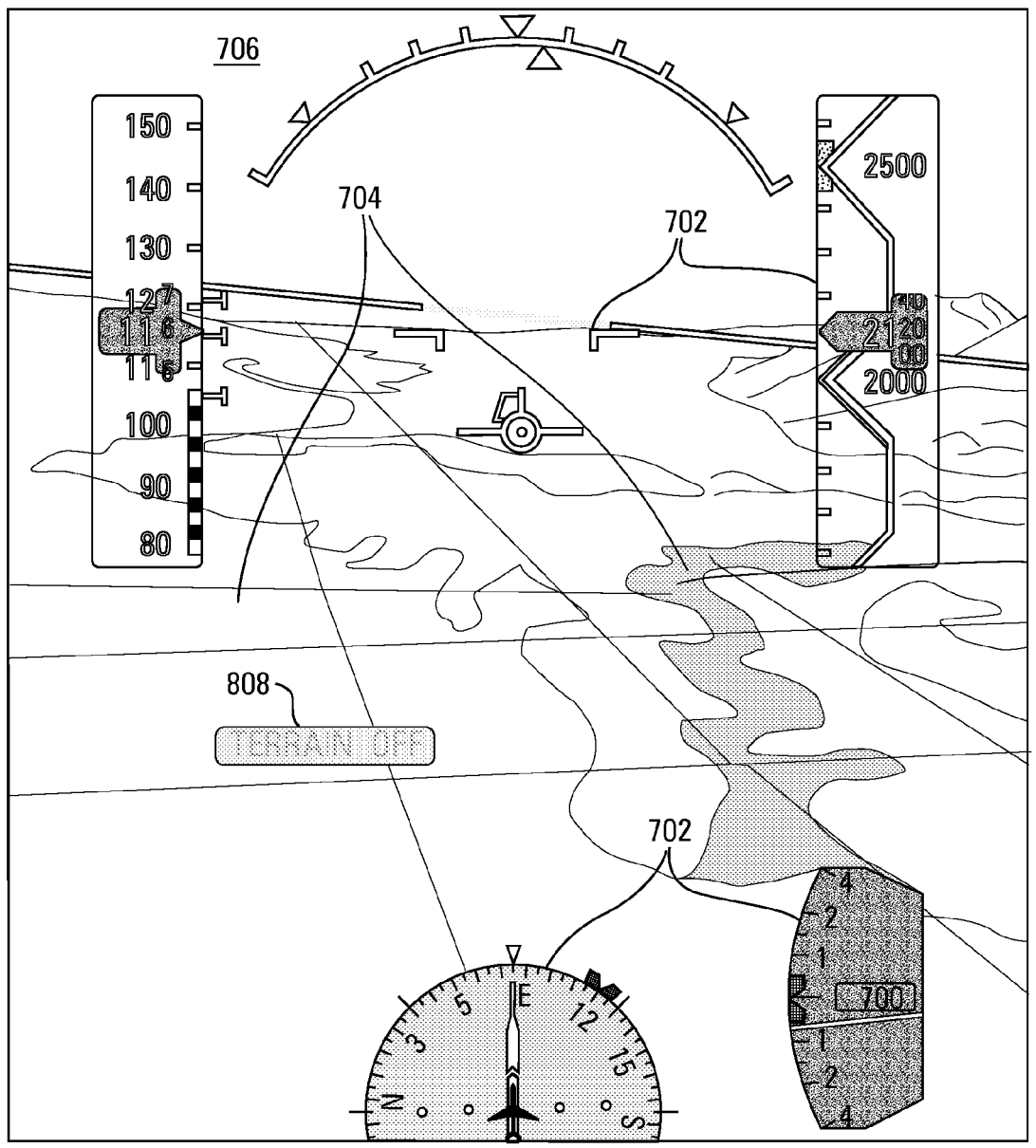
FIG. 8 is an image of a graphical display during final approach according to one embodiment of the present invention.
Figure 9:
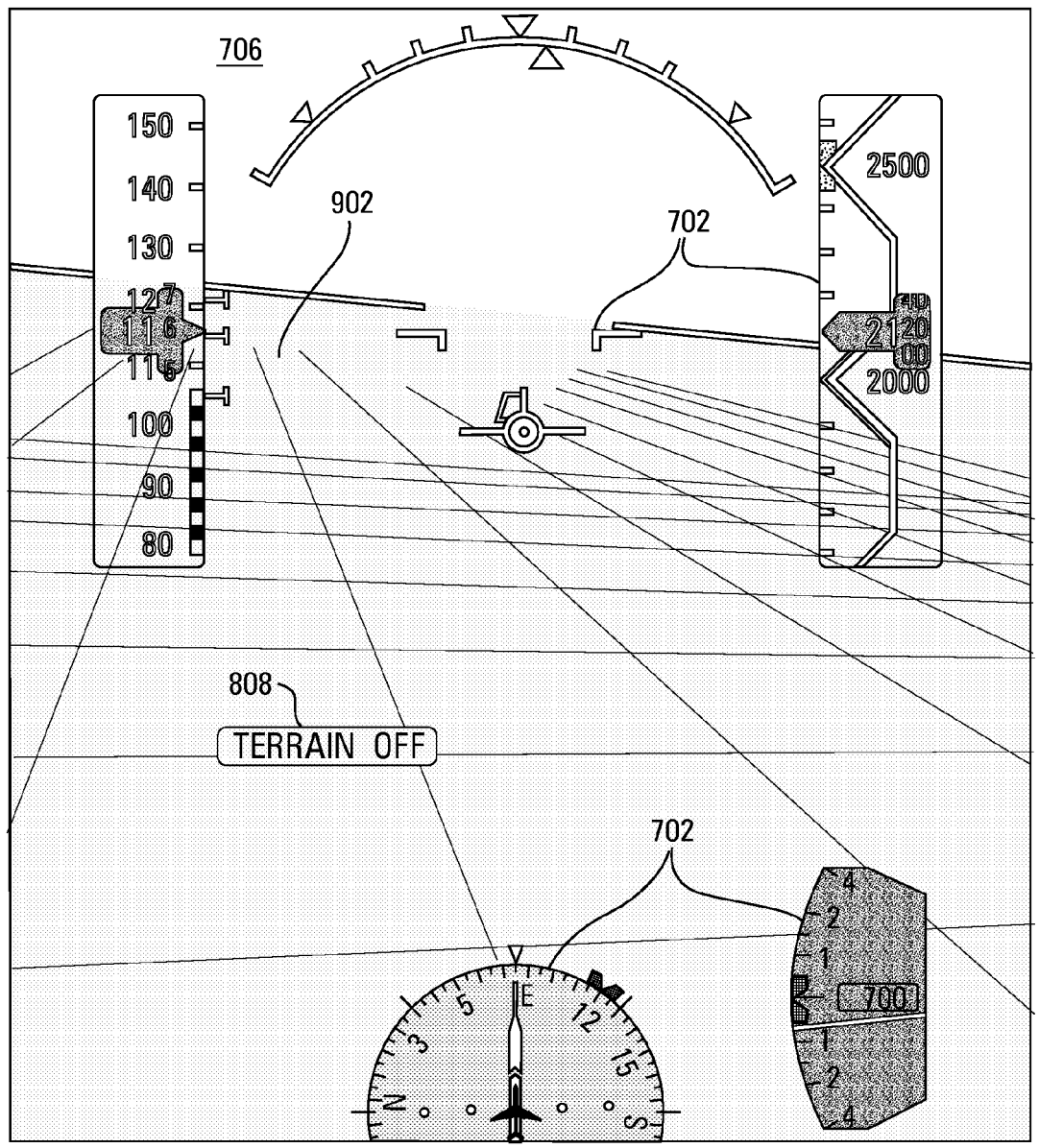
FIG. 9 is an image of a graphical display during final approach with terrain faded out completely according to one embodiment of the present invention.

In different embodiments, various means and methods are employed for making the determination to fade out synthetic vision terrain and objects on the display. Additionally, in different embodiments, various means and methods are employed for fading out synthetic vision terrain and objects on the display. FIGS. 2-5 show exemplary embodiments of 4 methods for making the determination when to start fading and how to fade out synthetic vision terrain and objects. It should be noted that although the methods described in FIGS. 2-5 refer to altitude, other position measurements can be used to trigger fading in or out of synthetic vision terrain and objects. For example, latitudinal and longitudinal data can be used in determining when to fade in or out synthetic vision terrain and objects. FIGS. 7-9 show images of an exemplary embodiment of a graphical display during this process. FIGS. 2-5 and 7-9 are exemplary embodiments of the present invention implemented in aircraft. However, it will be understood by one of skill in the art that other embodiments of the present invention are implemented in other types of vehicles, crafts, and displays.

At least with respect to pilots in aircraft, fading out synthetic vision terrain and objects as a cue to pilots that they should start relying on looking out the window or on real-time sensor data has a number of advantages. First, by not being able to view synthetic vision terrain and objects on the display, pilots intuitively know that they must start looking out the window or relying on real-time sensor data since the synthetic vision terrain and display is no longer available. Second, by fading out synthetic vision terrain and objects rather than immediately removing it, pilots are spared the stress and anxiety associated with an abrupt loss of the synthetic vision terrain and objects. Fading out the synthetic vision terrain and objects gives pilots time to adjust and orient themselves to looking out the window or relying on real-time sensor data rather than relying on potentially misleading and hazardous synthetic vision terrain and obstacle data on the display. Lastly, fading out terrain rather than immediately removing it helps prevent the possibility of flashing terrain. Flashing could occur if displaying and removing the terrain occurs immediately based on a particular set altitude and the aircraft maintains its altitude around that set altitude for a period of time. In some embodiments, terrain does not begin to fade out until a set period of time has elapsed after reaching an altitude which triggers fading. This further helps prevent flashing.

Figure 2:
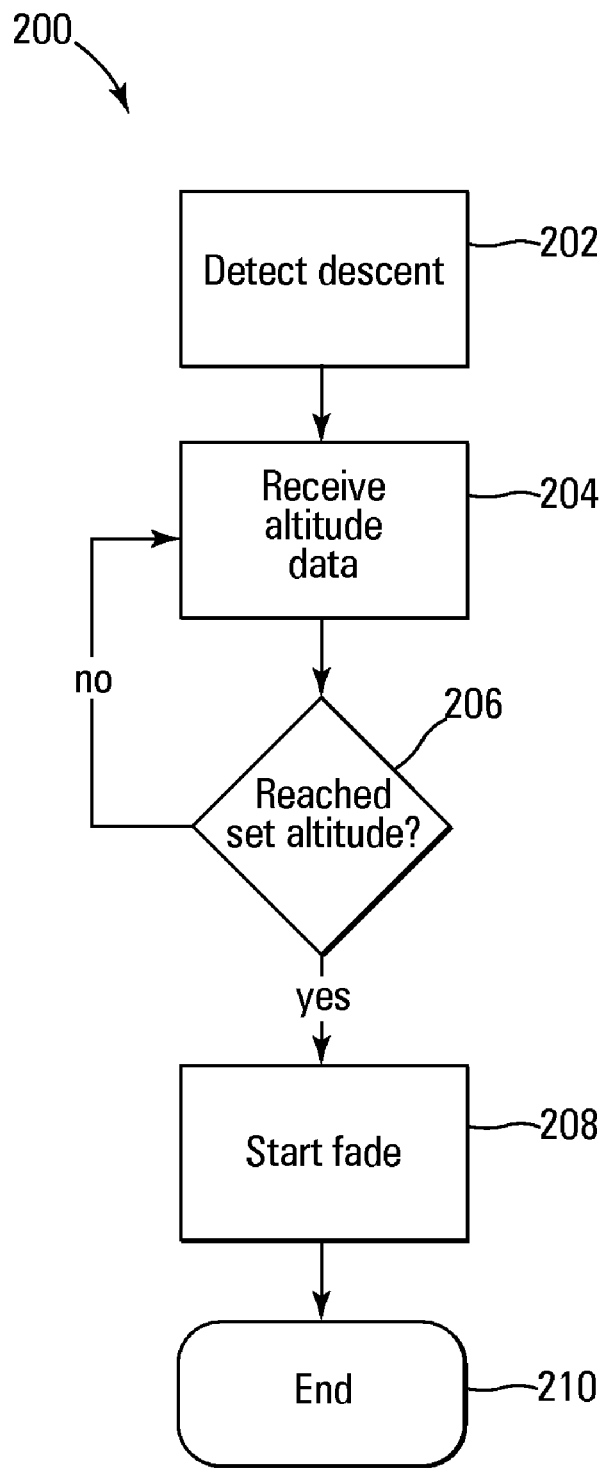
FIG. 2 is a flow chart showing a method of removing synthetic vision terrain and objects from a display according to another embodiment of the present invention.

FIG. 2 is a flow chart showing a method 200 of removing synthetic vision terrain and objects from a display according to another embodiment of the present invention. At 202, descent of the aircraft is detected. By waiting to begin the process until descent is detected, processor power and memory can be conserved by not performing other processes until needed. For example, where other processes are only needed during final approach, these processes are not run until descent of the aircraft is detected. In some embodiments, this is accomplished by comparing current altitude to an average of previous altitudes.

At 204, current altitude data is received. At 206, a determination is made to fade out synthetic vision terrain and objects on the display based on the aircraft descending to a particular altitude. Once the aircraft has descended to a particular altitude, the synthetic vision terrain and objects start fading out at 208. In this embodiment, the synthetic vision terrain and objects are faded based on a set time frame for fading. For example, in some embodiments, the synthetic vision terrain and objects are faded over the time frame of 3 seconds. In other embodiments, other lengths of time are used. If it is determined that the aircraft has not descended to the set altitude, the process returns to 204 to receive updated current altitude data. At 206, Based on the updated current altitude data, a determination is again made regarding fading out the synthetic vision terrain and objects or not. This loop will continue until it is determined to start fading out the synthetic vision terrain and objects. Once the synthetic vision terrain and objects are faded out, method 200 ends at 210.

Figure 3:
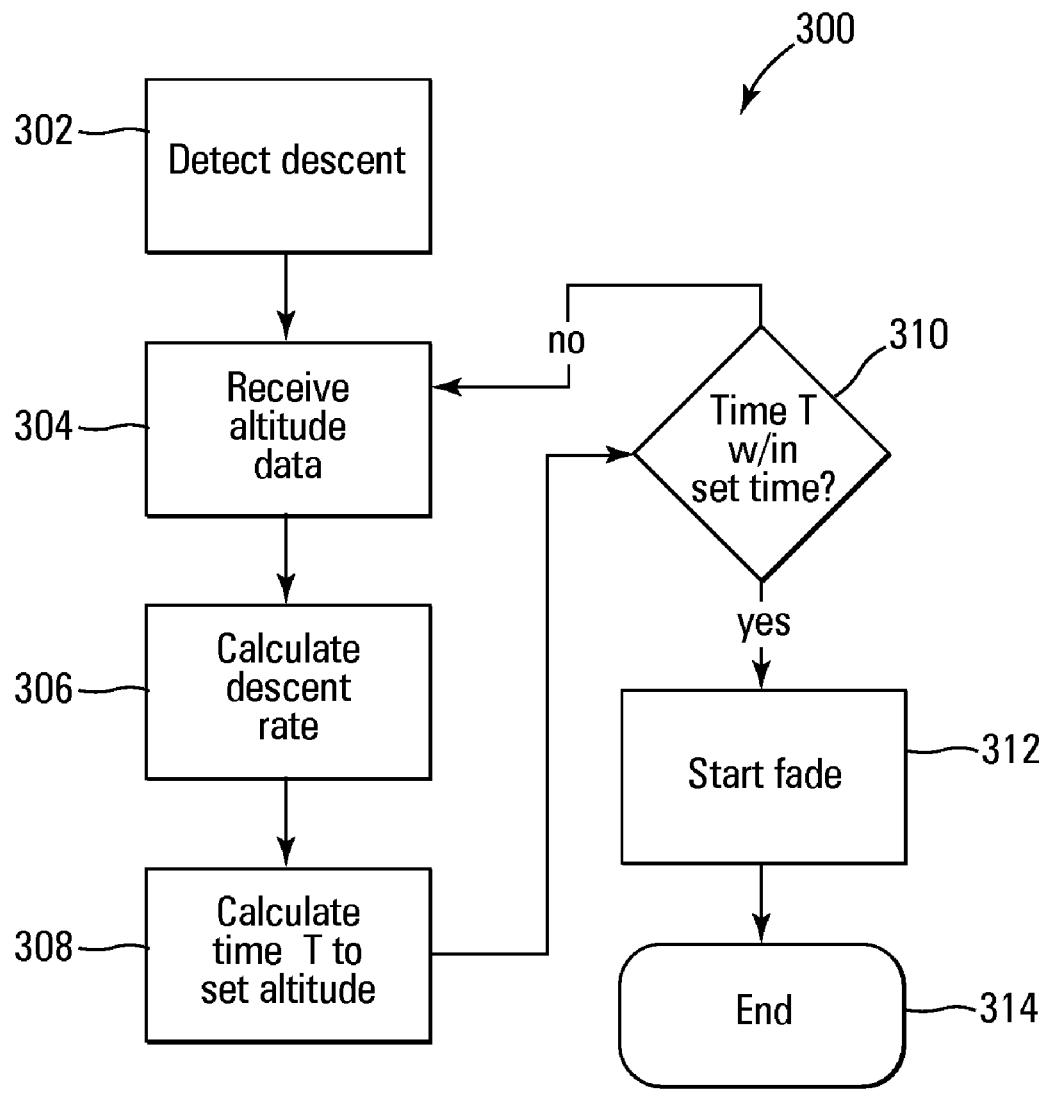
FIG. 3 is a flow chart showing a method of removing synthetic vision terrain and objects from a display according to another embodiment of the present invention.

FIG. 3 is a flow chart showing a method of removing synthetic vision terrain and objects from a display according to another embodiment of the present invention. At 302, descent of the aircraft is detected. At 304, current altitude data is received. At 306, the rate of descent of the aircraft is calculated. Notable, although a rate of descent is described in this example, it is to be understood that other rates of movement can be used in other embodiments. For example, a rate of approach towards a set position can be used in some embodiments.

At 308, based on the rate of descent, the time T it takes to descend to a set altitude is calculated. At 310, the time T is compared to a set time duration for fading out the synthetic vision terrain objects on the display. If T is greater than the set time duration, the process returns to 304 and repeats until time T is less than the set time duration. If time T is less than the set time duration, the synthetic vision terrain and objects begin to fade out at 312. Thus, upon descending to the set altitude, synthetic vision terrain and objects will be substantially faded out from the display.

Figure 4:
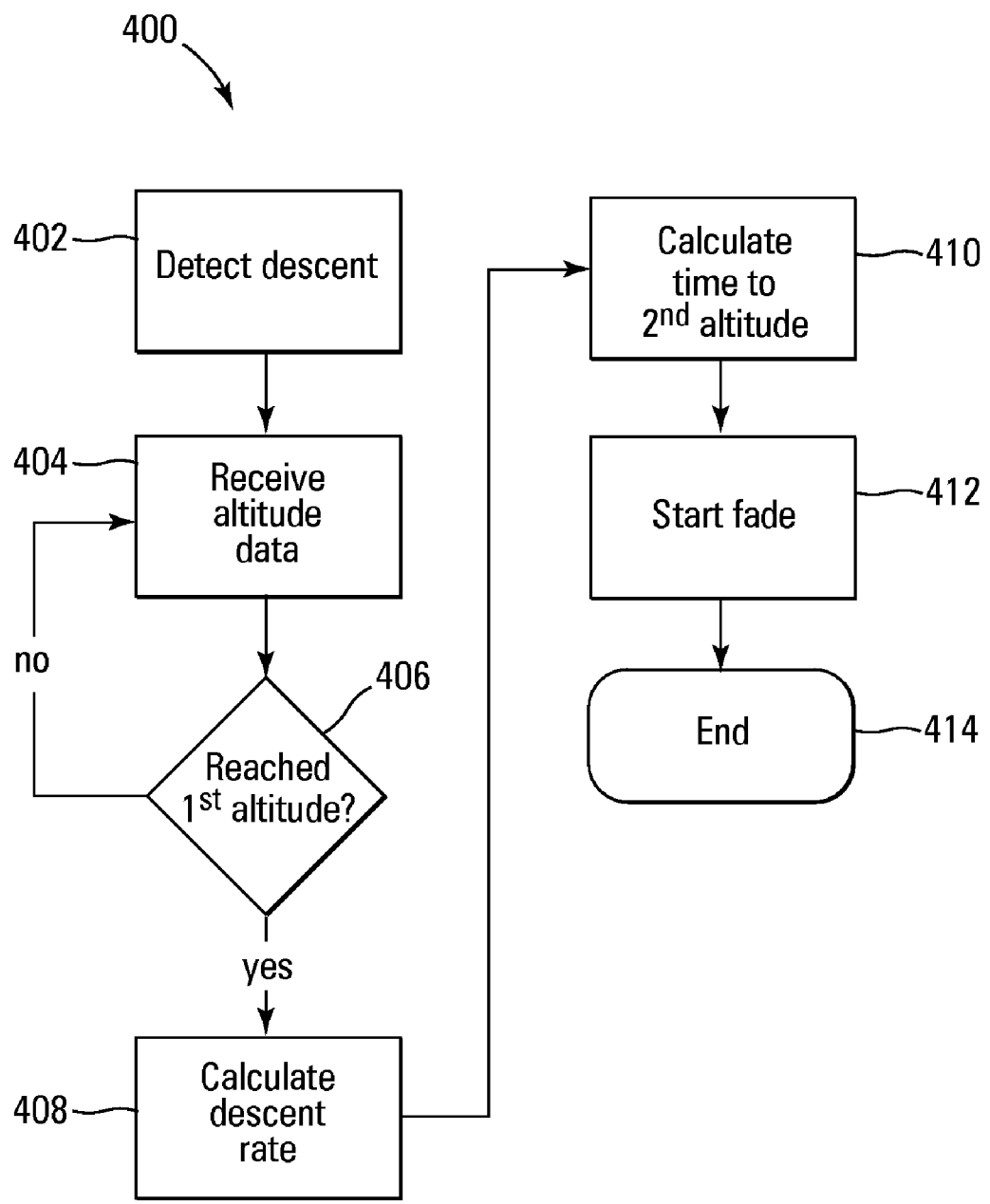
FIG. 4 is a flow chart showing a method of removing synthetic vision terrain and objects from a display according to another embodiment of the present invention.

FIG. 4 is a flow chart showing a method of removing synthetic vision terrain and objects from a display according to another embodiment of the present invention. At 402, descent of the aircraft is detected. At 404, current altitude data is received. At 406, it is determined if the aircraft has descended to a first set altitude. If it has not, the process returns to 404 where updated current altitude data is received. Once it is determined that the aircraft has descended to a first set altitude, a descent rate is calculated at 408. Based on the descent rate calculated at 408, the time T it will take to descend to a second set altitude is calculated at 410. At 412, fading out of the synthetic vision terrain and objects begins. The time frame for fading out the synthetic vision terrain and objects is the time T. Thus, fading out of synthetic vision terrain and objects is substantially completed upon reaching a second set altitude, assuming a near constant descent rate. In other embodiments, the descent rate and time T are continuously updated such that despite changes in the descent rate, fading out of synthetic vision terrain and objects is still substantially completed upon reaching a second set altitude. At 414, method 400 ends once fading out is completed.

Figure 5:
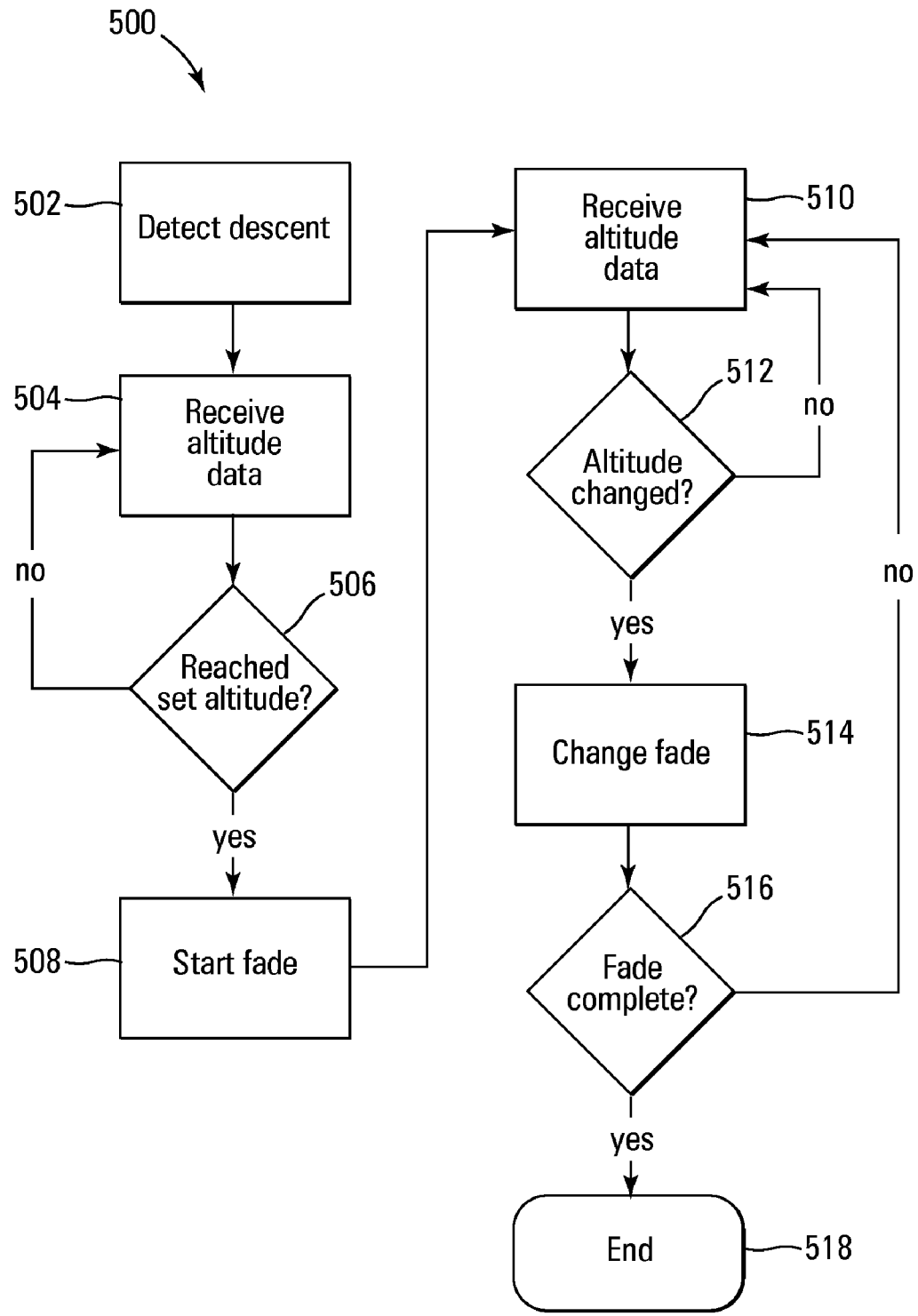
FIG. 5 is a flow chart showing a method of removing synthetic vision terrain and objects from a display when according to another embodiment of the present invention.

FIG. 5 is a flow chart showing a method of removing synthetic vision terrain and objects from a display according to another embodiment of the present invention. At 502, descent of the aircraft is detected. At 504, current altitude data is received. At 506, it is determined if the aircraft has descended to a first set altitude. If it has not, the process returns to 504 where updated current altitude data is received. Once it is determined that the aircraft has descended to a first set altitude, fading out begins at 508. The fading out at 508 is not based on a time frame, in this embodiment, but on a distance between a first set altitude and a second set altitude. The distance separating the first and second altitudes is divided into N increments, each increment corresponding to a percentage of fading out of synthetic vision terrain and objects. In some embodiments, the size of the N increments is substantially equal for each of the N increments. In other embodiments, the distance separating the first and second altitudes is divided into N increments of varying size.

At 510, updated current altitude data is received. At 512, it is determined if the aircraft altitude has changed. If it has not, the process returns to 510 to receive updated current altitude data. If current aircraft altitude has changed since the previous check, the process continues at 514 where fading out synthetic vision terrain and objects continues. In some embodiments, each of the N increments of distance between a first and second altitude corresponds to a percentage of fading. In some such embodiments, if the current altitude is greater than the previous altitude, the synthetic vision terrain and objects become less faded, based on the number of N increments between the current altitude and the previous altitude. If the current altitude is less than the previous altitude, the synthetic vision terrain and objects become incrementally more faded, based on the number of N increments between the current altitude and the previous altitude. In other embodiments, the synthetic vision terrain only becomes increasingly more faded. In these embodiments, if the current altitude is greater than the previous altitude, the fading is unaffected. If the current altitude is less than the previous altitude, the fading is increased according to the incremental decrease in altitude, i.e. the number of N increments between the current altitude and the previous altitude.

At 516, it is determined if fading the synthetic vision terrain and objects has completed. In one embodiment, this is determined by comparing the current altitude to the second set altitude. If the current altitude is less than the second set altitude, any remaining fading is completed and the process ends at 518. In another embodiment, completion of fading is determined by keeping a running calculation of the percentage of fading that remains to be completed. Once no fading remains to be completed (i.e. the synthetic vision terrain and objects have been 100 percent completed), the process ends at 518. Embodiments of the method described in FIG. 5, do not base the fading of synthetic vision terrain and objects on a set time frame. Therefore, if the aircraft remains at a particular altitude between a first and second set distance the synthetic vision terrain and objects do not completely fade out since at this altitude it may still be beneficial for pilots to be able to see synthetic vision terrain and objects. One example of such an event is if the aircraft is in a holding pattern at an altitude between a first and second set distance.

In some of the above embodiments in FIGS. 2-5, pilots have an override switch which aborts the process of fading out the synthetic vision terrain and objects on the display when used. In some such embodiments, pilots use this switch in low visibility conditions where relying on a view out a window is more dangerous than relying on synthetic vision terrain and objects. Additionally, in some of the above embodiments in FIGS. 2-5, prior to the process ending, a determination is made whether the synthetic vision terrain and objects should be faded back in. In some embodiments, this determination is based on detecting the aircraft ascend to a set abort altitude. In other embodiments, this determination is based on detecting the aircraft ascend to the first set altitude which triggered the fading out of the synthetic vision terrain and objects. The methods for fading in the synthetic vision terrain and objects are similar to the methods for fading out the synthetic vision terrain and objects as discussed above with respect to FIGS. 2-5.

Figure 6:
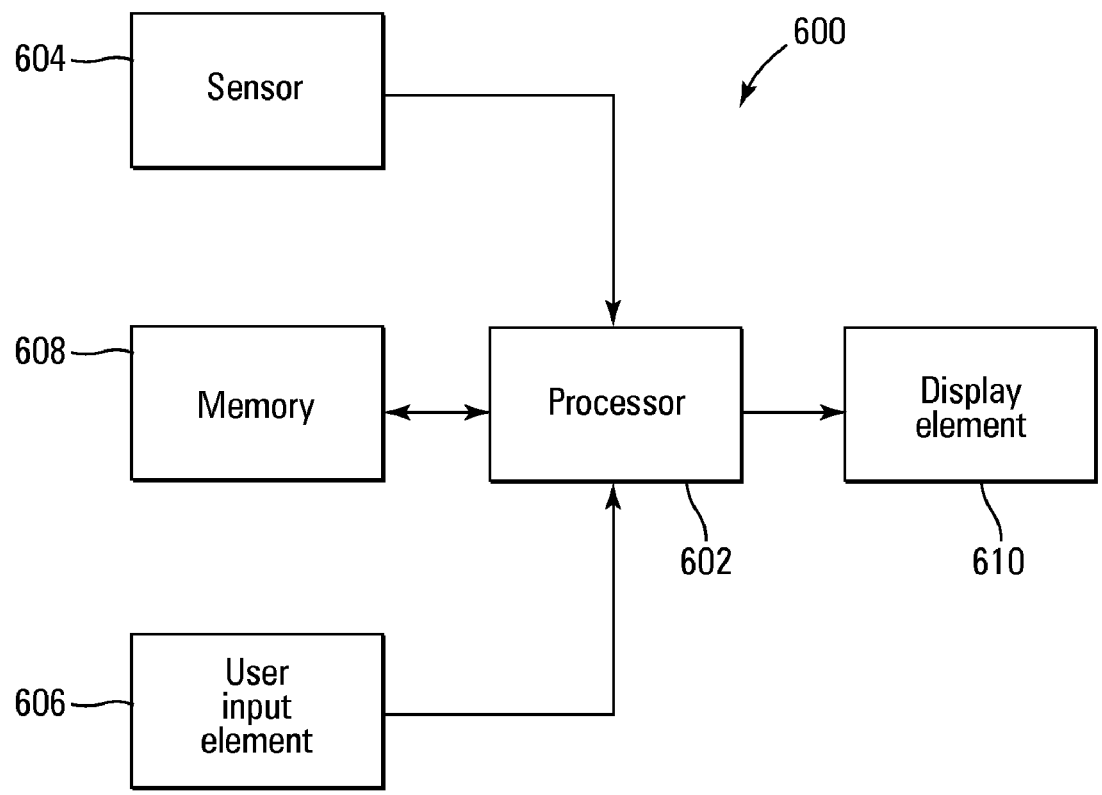
FIG. 6 is a block diagram of a display system according to one embodiment of the present invention.

FIG. 6 is a block diagram of a display system according to one embodiment of the present invention. In FIG. 6, an exemplary graphical display system 600 includes processor 602 configured to provide data for display to display element 610.

One or more data sources are coupled to processor 602. These data sources include, but are not limited to, sensors 604, user input element 606 and memory 608. In some embodiments, one or more of these data sources are omitted. In some embodiments, sensors 604 are used to provide data to processor 602 for use by processor 602 in determining when to fade out display terrain. For example, in some embodiments, sensors 604 provide data regarding altitude and location. In other embodiments, sensors 604 are also used to provide data to processor 602 for display on display element 610. For example, in some embodiments, sensors 604 provide photographs and digital images of terrain for display on display element 610. Sensors 604 include, but are not limited to, barometric altimeters, radar altimeters, cameras, global positioning system (GPS) receivers, speedometers, etc.

User input element 606 includes, but is not limited to, keyboards, touch screens, microphones, cursor control devices, line select buttons, etc. In some embodiments, user input element 606 comprises more than one type of input element. In other embodiments, display system 600 does not include user input element 606. User input element 606 is used to provide user feedback to display system 600. Such feedback includes, but is not limited to, an operator override of the computed determination to fade out display terrain.

Memory 608 includes any type of suitable medium such as floppy disks, conventional hard disks, CD-ROM, flash memory ROM, nonvolatile ROM, RAM, or other suitable medium. Processor 602 and memory 608 are coupled together allowing processor 602 to write to and store data in memory 608 as well as retrieve stored data from memory 608. In one embodiment, memory 608 stores data received by processor 602 from sensors 604 and user input element 606. In other embodiments, memory 608 temporarily stores data to be transmitted from processor 602 to display element 610. In other embodiments, memory 608 is used to store a database of graphics for retrieval by processor 602 and display on display element 610. In yet other embodiments, memory 608 is used to store data regarding completion of fading out display terrain, such as a percentage of fading out that remains to be completed or a record of previous and current altitude measurements.

Processor 602 includes or interfaces with hardware components that support the graphics display system. By way of example and not by way of limitation, these hardware components include one or more microprocessors, graphics processors, memories, storage devices, interface cards, and other standard components known in the art. Additionally, processor 602 includes or functions with software programs, firmware or computer readable instructions for carrying out various methods, process tasks, calculations, control functions, and the generation of display signals and other data used in the operation of the display system. These instructions are typically stored on any appropriate medium used for storage of computer readable instructions such as floppy disks, conventional hard disks, CD-ROM, flash ROM, nonvolatile ROM, RAM, and other like medium. In some embodiments, these instructions are stored on memory 608.

Display element 610 includes any display element suitable for displaying the various symbols and information for the operation of embodiments of the present invention. There are many known display elements that are suitable for this task, such as various CRT, active matrix LCD and passive matrix LCD display systems. Processor 602 sends appropriate signals and data to display element 610. These signals and data instruct display element 610 which graphics to display and include instructions for fading out display terrain necessary for the operation of embodiments of the present invention.

FIG. 7 is an image of a graphical display during flight according to one embodiment of the present invention. As shown, FIG. 7 includes primary flight display graphics 702, terrain 704 and sky 706. During flight, prior to final approach, terrain 704 can be clearly seen and is a great aid in helping pilots navigate.

FIG. 8 is an image of a graphical display during final approach according to one embodiment of the present invention. As shown, FIG. 8 also includes primary flight display graphics 702, terrain 704 and sky 706. As shown, terrain 704 has begun to fade and a flat background is beginning to replace terrain 704. Additionally, in some embodiments, the color of sky 706 begins to change as well. In some embodiments, during normal flight, sky 706 is a deep sky blue. In some embodiments when the color of sky 706 changes, the color changes to a more intense bright blue. In other such embodiments, the color of sky 706 changes to a different color. Additionally, in some embodiments, warning 808 begins to be displayed. Warning 808 indicates to a pilot in words that the terrain is being turned off or faded away. In other embodiments, warning 808 is not included. In other embodiments, warning 808 is manifest in other forms such as auditory forms.

FIG. 9 is an image of a graphical display during final approach with terrain faded out completely according to one embodiment of the present invention. As shown, primary flight display graphics 702 remain clearly visible while terrain 704 has been completely faded out and replaced by flat background 902. In some embodiments, flat background 902 has a bright brown color. In other embodiments, a different color is used for flat background 902. In some embodiments, flat background 902 is rendered as a 3-dimensional plane extending to an infinite horizon. In other embodiments, flat background 902 is rendered as a traditional 2-dimensional background. Also, in embodiments when sky 706 changes color, the color is completely changed in FIG. 9. Additionally, in embodiments displaying warning 808, warning 808 is now clearly visible. In FIG. 9 a pilot loses sight of display terrain but the pilot can continue to see and use primary flight display graphics 702. The gradual loss of terrain 704 and color change of sky 706 indicates to the pilot that it is time to switch views and rely on a view out the window. Additionally, the gradual loss does not startle or shock a pilot as an immediate removal of terrain would. Thus, in the event that the pilot was referring to the display terrain when it begins to fade, the pilot will have to time to orient himself to viewing out the window before the display terrain is completely faded away. Finally, embodiments of the present invention make it easier for pilots to make the adjustment to viewing out the window during final approach by not requiring them to manually monitor when they have reached the particular altitude at which they must start looking out the window. Instead they can focus their attention on other important matters related to a final approach.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of displays, such as displays in space craft landing on the moon, earth or other celestial bodies. This application is intended to cover any adaptations or variations of the present invention. Therefore, it is manifestly intended that this invention be limited only by the claims and the equivalents thereof.

What is claimed is:

1. A method of removing synthetic vision terrain and objects from a graphical display deployed on an aircraft, the method comprising:
   receiving current position data from at least one sensor;
   determining when the current position data indicates that the aircraft is in final approach prior to landing; and
   fading out the synthetic vision terrain and objects gradually when the current position data indicates that the aircraft is in final approach.

2. The method of claim 1, wherein the synthetic vision terrain and objects are representative of real-word objects, and wherein fading out the synthetic vision terrain and objects gradually comprises:
   fading out the synthetic vision terrain and objects independently of the proximity of the real-world objects to the aircraft.

3. The method of claim 1, wherein fading out the synthetic vision terrain and objects gradually comprises:
   simultaneously removing substantially all synthetic vision terrain and objects from the graphical display when the current position data indicates that the aircraft is in final approach.

4. The method of claim 1, wherein determining when to fade out the synthetic vision terrain and objects comprises:
   comparing current position to a set position; and
   making a decision to fade out the synthetic vision terrain and objects once current position data indicates that the set position has been reached.

5. The method of claim 4, wherein fading out the synthetic vision terrain and objects gradually comprises:
   calculating an approach rate;
   calculating a time period T to travel from the set position to a second set position based on the calculated approach rate; and
   fading out the synthetic terrain and objects at a substantially uniform rate over the calculated time period T.

6. The method of claim 1, wherein fading out the synthetic terrain and objects gradually comprises:
   dividing the distance between a first set position and a second set position into N increments;
   assigning a percentage of fading synthetic terrain and objects to each of said N increments; and
   fading out the synthetic terrain and objects said assigned percentage upon reaching each of said N increments.

7. The method of claim 6, wherein dividing the distance between the first set position and the second set position into N increments includes one of:
   dividing the distance between the first set position and the second set position into N equal increments; and
   dividing the distance between the first set position and the second set position into N increments of varying size.

8. The method of claim 6, wherein fading out the synthetic terrain and objects said assigned percentage comprises:
   comparing current position data to previous position data to determine if position has changed; and
   changing the percentage of fading of the synthetic terrain and objects based on the number of N increments between the current position and the previous position.

9. The method of claim 1, wherein determining comprises:
   calculating an approach rate;
   calculating a time T to reach a set position based on the calculated approach rate;
   comparing time T to a set time period; and
   making a determination to begin fading when time T is less than said set time period.

10. The method of claim 9, wherein fading out the synthetic terrain and objects gradually comprises:
    fading out the synthetic terrain and objects over time period T.

11. A computer program product for use in a graphical display system deployed on an aircraft, comprising:
    a computer-usable medium having computer-readable code embodied therein for configuring a computer processor, the computer-usable medium comprising:
    first executable computer-readable code configured to cause a computer processor to receive current position data relative to a final destination;
    second executable computer-readable code configured to cause a computer processor to determine when to fade out synthetic terrain and objects on a display when the aircraft is in final approach prior to landing and based on the relation of current position to the final destination; and
    third executable computer-readable code configured to cause a computer processor to fade out the synthetic terrain and objects gradually when determined.

12. The computer program product of claim 11, further comprising:
    fourth executable computer-readable code configured to cause a computer processor to cease fading out the synthetic terrain and objects upon receiving a user input indicating that synthetic terrain and objects should continue to be displayed.

13. The computer program product of claim 11, wherein the second executable computer-readable code is further configured to cause a computer processor to:
    calculate a rate of movement;
    calculate a time T to reach a set position relative to the final destination based on the calculated rate of movement;
    compare the time T to a set time period; and
    make a determination to begin fading when the time T is less than the set time period.

14. The computer readable medium of claim 13, wherein the second executable computer-readable code is further configured to cause a computer processor to fade out the synthetic terrain and objects substantially uniformly over time T.

15. A graphical display system configured to be deployed on an aircraft, comprising:
    A display element adapted to display synthetic terrain and objects;
    At least one sensor adapted to receive position data; and
    At least one processing unit adapted to receive and process position data from the at least one sensor;
    Wherein, the at least one processing unit is adapted to determine, based on a relation of the position data to a final destination, when and how the synthetic terrain and objects should be faded out of the display element, and to send signals to the display element directing the display element to fade out the synthetic terrain and objects;
    The at least one processing unit adapted to fade out the synthetic terrain and objects during final approach prior to landing.

16. The graphical display system of claim 15, wherein position data includes one of altitude data, and latitudinal/longitudinal data.

17. The graphical display system of claim 15, wherein the at least one processing unit is adapted to compare current position to a set position relative to a final destination; and to send signals to the display element to start fading out the synthetic terrain and objects when the current position is closer to the final destination than the set position.

18. The graphical display system of claim 15, wherein the at least one processing unit is adapted to send signals to the display element to fade out the synthetic terrain and objects substantially uniformly over a set period of time.

19. The graphical display system of claim 15, further comprising:

a user input element adapted to provide user input to the at least one processing unit, wherein the user input indicates if fading out of synthetic terrain and objects should be aborted.

20. The graphical display system of claim 15, wherein the at least one processing unit is adapted to calculate a rate of movement;

to calculate a time T to reach a set position relative to the final destination based on the calculated rate of movement;

to compare the time T to a set time period; and to make a determination to begin fading when the time T is less than the set time period.

* * * * *